Sept. 24, 1940.   R. TRAUT   2,215,943
METHOD FOR THE PRODUCTION OF HOLLOW BODIES CLOSED AT ONE SIDE BY
PUNCHING OF FOUR-EDGED BLOCKS
Filed Sept. 22, 1937
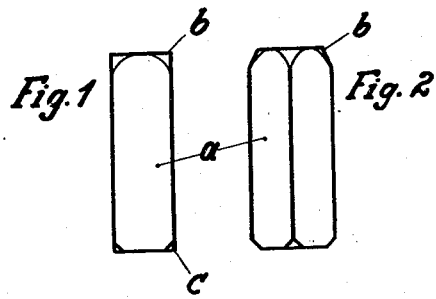
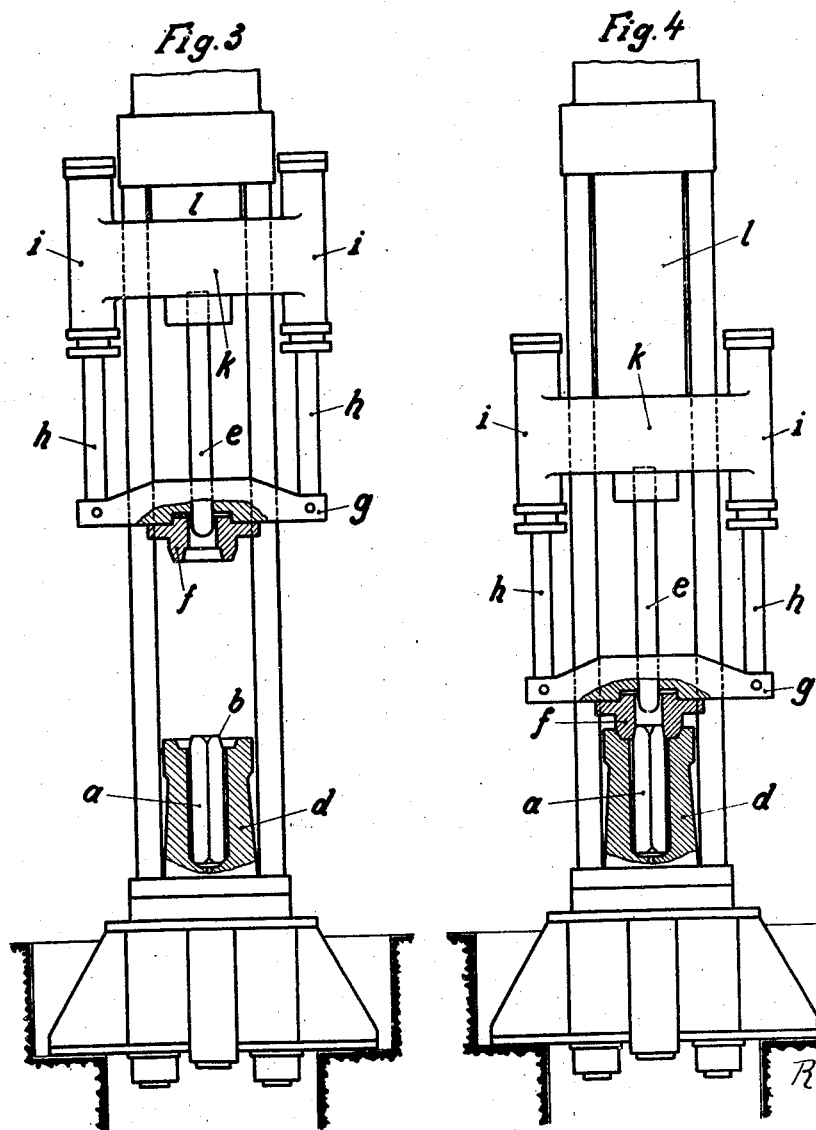

Patented Sept. 24, 1940

2,215,943

UNITED STATES PATENT OFFICE 2,215,943

METHOD FOR THE PRODUCTION OF HOLLOW BODIES CLOSED AT ONE SIDE BY PUNCHING OF FOUR-EDGED BLOCKS

Rudolf Traut, Mulheim-on-the-Ruhr, Germany

Application September 22, 1937, Serial No. 165,224
In Germany November 7, 1936

5 Claims. (Cl. 29—148.2)

In the manufacturing of seamless pipes on Erhardt's slotting bench one starts from cylindrical hollow bodies, (pipe blooms) closed at one side and produced on a punching press by punching of four-edged blocks. The blooms, produced by punching from four-edged blocks, show at their open end beads, which appear as flaps on the punched pipe and are very disturbing during the subsequent treatment of the pipe. During the rolling of the punched pipes from the mandrel rod it easily happens that the flaps tear off and get jammed between the rolls and guides of the rolling machine, whereby damaging of this machine and stopping of the same may occur, so that the continuous production of pipes is interrupted. Even when the flaps are not torn off during the rolling, rending of the pipe occurs at the point of transition to the flaps. Prior to the subsequent cold drawing of the pipes not only the flaps, but also the portion of the pipe which has been split have to be removed by tapping. The scrap waste does not extend only to the flaps, but further to a part of the pipe itself. By this cutting off of the pipe end with the flaps and the scrap produced thereby special expenses are produced which mean increase of the costs of manufacture of the pipes. It has already been proposed to avoid the formation of the flaps on the pipe or of the beads on the bloom thereby that the beads were pressed off during the bloom-production owing to a special construction of the press. The manufacturing and construction of the press and the working method are, however, thereby complicated and become more expensive.

According to the invention, it is proposed to produce hollow bodies (pipe blooms) closed at one end and destined for subsequent treatment especially on the Erhardt slotting bench in such a manner that the block, prior to the insertion into the punching die, is submitted, for instance by turning or milling, to a treatment by which the material of the edges of the upper end of the block is removed in such a manner that cross-sections symmetrical to the longitudinal axis of the block and rounded edges inclined towards the longitudinal axis are produced. It has been found, that the beads on the pipe bloom or the flaps on the punched pipe are produced from the material in the edges of the upper end of the four-edged block. By removing this material the bead-formation on the bloom and therewith also the flap-formation on the punched pipe are avoided. It is necessary that the material be worked off quite uniformly from all edges of the upper block end, in order that a uniform distribution of the material is ensured. The treatment has consequently to be carried out in such a manner that the cross-sections are symmetrical to the longitudinal axis of the block. The transition from the upper block end to the solid block cross-section further must evidently take place gradually, so that rounded edges are produced which are inclined relative to the longitudinal axis. The four-edged block treated in this manner yields a bloom without bead and a pipe without flaps.

For the production of the pipe blooms in the usual manner four-edged blocks are employed, the diagonals of which correspond accurately to the diameter of the punch die, in order that the block is centered and during the pressing sits accurately in the punching die in which it is guided. For the production of pipe blooms according to this method four-edged blocks are therefor necessary which are rolled accurately to the prescribed diagonal measure, and which must be produced in an iron rod rolling mill and are consequently more expensive than four edged blocks rolled in blooming- or billeting mills. As the four-edged blocks to be worked to pipes represent only a preliminary product, blocks rolled in a blooming- or billeting mill would be sufficient if it were possible to produce them with diagonals accurately to measure. As this could, however, not be attained in these mills, the employment of such blocks was not possible up to the present.

Another particularly advantageous form of the method described, consists therein, that the block end treated according to this method is employed for centering the block in the punching die. This is done preferably with employment of the plate centering the punching mandrel which plate, with this object in view, has cavities in the shape of a truncated cone, corresponding to the form of the treated block end. As the treating of the block end, especially by turning off or milling off, is effected in such a manner that cross-sections are produced symmetrical to the longitudinal axis of the block, an accurate centering of the block is attained. Hereby it is possible to employ for the production of pipe blooms also four-edged blocks rolled on blooming- or billeting mills instead of those produced in the rod-mill, as for the centering of the block the accurate dimension of the diagonals, which are then smaller than the diameter of the punching die, is not material. The accuracy of the centering is still further increased, if prior to the punching, the foot end of the block is also treated in a similar manner as the upper block end. The foot end is then centered thereby that the bevelled faces bear against the conical portion of the bottom of the punching die. Centering and guiding of the block at both ends is thereby attained.

The method described will be hereinafter further explained on hand of the accompanying drawing, in which in Figs. 1 and 2 a four-edged block $a$ is shown in top plan view and elevation respectively. The upper end $b$ of the four edged block $a$ has been made conical by turning or milling so that in the treated portion cross-sections symmetrical to the longitudinal axis of the block and rounded edges are produced which are inclined towards the longitudinal axis. The foot $c$ of the block has been treated in a corresponding manner.

Figs. 3 and 4 show the production on the punching press of a pipe bloom from the block $a$ shown in Figs. 1 and 2. The treated ends $b$ and $c$ of the block $a$ are inserted into the punching die $d$, the treated foot $c$ of the block sitting in a corresponding recess of the die $d$ and is centered thereby. The punching is carried out by means of a punching mandrel $e$ guided in the centering plate $f$. This centering plate is fixed on the beam $g$ of the press, said beam being connected at its two ends with the piston rods $h$ of the pressure cylinders $i$. These pressure cylinders are fixed on the transverse head $k$ which can be pressed down by the press piston $l$.

The operation during the punching is as follows:—The transverse head $k$ being raised (Fig. 3), the four-edged block $a$ is inserted into the punching die $d$, its foot being centered in the bottom of the die. As the diagonals of the four-edged block are slightly smaller than the diameter of the punching die, it may happen that the block at first stands slightly inclined in the die. As soon, however, as the transverse head $k$ descends owing to the pressure of piston $l$, the centering plate $f$, the front end of which has a recess in the shape of a truncated cone corresponding to the shape of the upper block end which has been treated, comes to sit upon the head of the block so that the latter is quite accurately centered (Fig. 4). The punching mandrel $e$, guided by the centering plate $f$, then penetrates accurately into the centre of the block.

I claim:

1. Method for producing hollow bodies comprising taking a four-edged solid block, subjecting the block to a preliminary shaping treatment so as to conically taper only the outer end of the block, inserting the block in a die, confining the conically tapered outer end of the block when in the die, and finally exerting a punching and compressing action on the block to alter the cross sectional shape to that of a hollow tube having a smooth outer surface.

2. A method as claimed in claim 1, including the additional step of preshaping the inner end of the block similarly to the outer end.

3. A method as claimed in claim 1, including the step of first rolling a four-edged block in a blooming or billeting mill.

4. A method as claimed in claim 1, including the step of embracing and confining the upper end of the block simultaneously with the punching and compressing action.

5. Method for producing hollow bodies comprising taking a four-edged solid block, subjecting the block to a preliminary shaping treatment so as to conically taper the block only at the outer end thereof, inserting the block in a die, arranging an apertured confining plate over the upper end of the block when in the die so as to confine the outer end of the block, and exerting a punching and compressing action on the free central portion of the upper end of the block to alter the cross sectional shape to that of a hollow tube having a smooth outer surface.

RUDOLF TRAUT.